United States Patent
Roman et al.

(10) Patent No.: US 11,121,791 B2
(45) Date of Patent: Sep. 14, 2021

(54) METHOD FOR MONITORING DATA EXCHANGE OVER A NETWORK OF THE H LINK TYPE IMPLEMENTING A TDMA TECHNOLOGY

(71) Applicant: BULL SAS, Les Clayes-sous-Bois (FR)

(72) Inventors: Alexandre Roman, Hyères (FR); Michel Cartier, Toulon (FR); Dominique Foison, Le Beausset (FR)

(73) Assignee: BULL SAS, Les Clayes sous-Bois (FR)

( * ) Notice: Subject to any disclaimer, the term of this patent is extended or adjusted under 35 U.S.C. 154(b) by 0 days.

(21) Appl. No.: 15/352,001

(22) Filed: Nov. 15, 2016

(65) Prior Publication Data
US 2017/0141866 A1 May 18, 2017

(30) Foreign Application Priority Data
Nov. 16, 2015 (FR) ..................................... 1502391

(51) Int. Cl.
*H04J 3/14* (2006.01)
*H04L 12/26* (2006.01)
(Continued)

(52) U.S. Cl.
CPC .............. *H04J 3/14* (2013.01); *H04B 7/2643* (2013.01); *H04J 3/1694* (2013.01); *H04L 43/12* (2013.01);
(Continued)

(58) Field of Classification Search
CPC ........... H04J 3/14; H04J 3/1694; H04L 67/34; H04L 43/12; H04L 67/125; H04B 7/2643; H04W 72/0446
See application file for complete search history.

(56) References Cited

U.S. PATENT DOCUMENTS 5,167,035 A * 11/1992 Mann ...................... H04L 29/00
370/250
6,330,441 B1 * 12/2001 Onodera ............... H04W 84/16
370/338
(Continued)

FOREIGN PATENT DOCUMENTS

EP          0 837 567 A2    4/1998

OTHER PUBLICATIONS

Search Report and Written Opinion as issued in French Patent Application No. 1502391, dated Aug. 24, 2016.
(Continued)

*Primary Examiner* — Gregory B Sefcheck
*Assistant Examiner* — Joshua Smith
(74) *Attorney, Agent, or Firm* — Arc IP Law, PC; Joseph J. Mayo

(57) ABSTRACT

A method for monitoring data exchange over a network of the H link type implementing a technology of the TDMA type includes transmitting a monitoring agent from a remote server to a communication server, installing the monitoring agent on the communication server, launching the monitoring agent on the communication server, the monitoring agent implementing an interface for receiving and for transmitting data designed and arranged to receive the data received by the communication server and transmit the data received by the monitoring agent to the remote server, transmitting the data received by the monitoring agent to the remote server, the transmission of the data received being carried out by the monitoring agent.

12 Claims, 2 Drawing Sheets

(51) Int. Cl.
*H04B 7/26* (2006.01)
*H04W 72/04* (2009.01)
*H04L 29/08* (2006.01)
*H04J 3/16* (2006.01)

(52) U.S. Cl.
CPC ......... *H04L 67/34* (2013.01); *H04W 72/0446* (2013.01); *H04L 67/125* (2013.01)

(56) References Cited

U.S. PATENT DOCUMENTS

| | | | |
|---|---|---|---|
| 6,888,817 B1* | 5/2005 | Shyy | H04W 64/00 370/347 |
| 2001/0053971 A1* | 12/2001 | Demetrescu | H04L 1/0014 704/201 |
| 2003/0161265 A1 | 8/2003 | Cao et al. | |
| 2005/0232207 A1* | 10/2005 | Antoniadis | H04W 84/20 370/338 |
| 2006/0114826 A1* | 6/2006 | Brommer | H04J 3/1682 370/230 |
| 2008/0096483 A1* | 4/2008 | Van Buren | H04B 1/3877 455/11.1 |
| 2009/0113244 A1* | 4/2009 | Doshi | H04W 24/08 714/25 |
| 2010/0027434 A1* | 2/2010 | Chung | H04L 41/5009 370/252 |
| 2010/0313265 A1* | 12/2010 | Lin | H04L 29/12915 709/225 |
| 2012/0023558 A1* | 1/2012 | Rafiq | H04L 63/08 709/202 |
| 2012/0039320 A1* | 2/2012 | Lemson | H04L 5/0048 370/338 |
| 2012/0224858 A1* | 9/2012 | Chen | H04J 3/1617 398/98 |
| 2012/0275468 A1* | 11/2012 | Leprovost | H04N 21/234327 370/442 |
| 2013/0103973 A1* | 4/2013 | Werth | G06F 9/5072 714/2 |
| 2013/0198393 A1* | 8/2013 | Etani | H04L 67/14 709/227 |
| 2013/0297422 A1* | 11/2013 | Hunter | H04W 4/023 705/14.58 |
| 2014/0105214 A1* | 4/2014 | Li | H04L 61/2015 370/392 |
| 2015/0242204 A1* | 8/2015 | Hassine | H04L 41/5045 717/121 |
| 2015/0319267 A1* | 11/2015 | Donovan | H04L 63/0892 709/203 |
| 2016/0021011 A1* | 1/2016 | Vasseur | H04L 47/127 370/235 |

OTHER PUBLICATIONS

Gräupl, T., et al., "L-DACS1 Air-to-Air Data-Link Protocol Design and Performance," Integrated Communications, Navigation and Surveillance Conference (ICNS), May 2011, ISBN: 978-1-4577-0593-9, XP031953160, pp. 1-14.

* cited by examiner

METHOD FOR MONITORING DATA EXCHANGE OVER A NETWORK OF THE H LINK TYPE IMPLEMENTING A TDMA TECHNOLOGY

CROSS-REFERENCE TO RELATED APPLICATIONS

This application claims priority to French Patent Application No. 1502391, filed Nov. 16, 2015, the entire content of which is incorporated herein by reference in its entirety.

TECHNICAL FIELD

This invention relates, in the field of information technology, to a method for monitoring data exchange over a network of the H link type implementing a time division multiple access (TDMA) technology. This invention also relates to a system for monitoring data exchange over a network of the H link type implementing a TDMA technology. This invention applies in particular to data exchanges between terminals of the PR4G type.

PRIOR ART

In a known manner, the architecture of a network of the H link type is an architecture of the TDMA type where time is divided into indivisible entities: time slots (TS). Time slots are generally allocated to terminals belonging to the H network. Each terminal can emit data during time slots that were allocated to it beforehand. Furthermore, when a terminal is not emitting, it is in a position to receive information transmitted by the terminals belonging to the H network. In other words, a network of the H link type is based on the broadcast principle. When a terminal is transmitting information, it is made available to all of the other participants. The knowledge of the time slots by each one of the terminals requires that they have a precise synchronisation mechanism. All of the time synchronised terminals form a network of the H link type. The TDMA technology guarantees access and speaking time to each one of the terminals in the cycle formed by a set of 128 time slots at most.

Moreover, the PR4G terminals are able to provide various services such as for example voice, data transmission, control messaging, real-time messaging, extended network messaging or radio telephone services.

DISCLOSURE OF THE INVENTION

In this context, the invention relates to a method for monitoring data exchange over a network of the H link type implementing time division multiple access technology that makes it possible to control the data exchanged between various terminals, for example, over a theatre of operations.

For this purpose, an aspect of the invention relates to a method for monitoring data exchange over a network of the H link type implementing a time division multiple access technology, with the method comprising the steps of:

Transmitting a monitoring agent from a remote server to a communication server,
Installing said monitoring agent on the communication server,
Launching said monitoring agent on the communication server, said monitoring agent implementing an interface for receiving and for transmitting data designed and arranged to receive the data received by the communication server and transmit said data received by said monitoring agent to the remote server,
Receiving by said monitoring agent of data received by the communication server,
Transmitting said data received by said monitoring agent to the remote server, with said transmission of said data received being carried out by said monitoring agent.

Thanks to the method of the invention and in particular to the monitoring agent installed on the communication server of a network of the H link type implementing a technology of the TDMA type, it is possible to remotely view the information exchanged over the network.

The method according to the invention can also have one or several of the characteristics hereinafter, considered separately or according to all technically permissible combinations.

In a non-limiting embodiment, the installation of the monitoring agent on the communication server is carried out by means of a container of the communication server.

In a non-limiting embodiment, the transmission of the monitoring agent to the communication server is carried out via a connection of the LAN type.

In a non-limiting embodiment, the transmission of data from the monitoring agent to the remote server is carried out according to the communication protocol of the UDP type.

In a non-limiting embodiment, the transmission of data from the monitoring agent is carried out by associating a time slot number with the data transmitted on said time slot.

In a non-limiting embodiment, the method comprises an additional step of interpreting and of logging data transmitted by the monitoring agent, with said step of interpreting and of logging being carried out by a system for interpreting and for logging of the remote server.

In a non-limiting embodiment, the method comprises an additional step of displaying a TDMA cycle in real time, said displaying being carried out by a man-machine interface.

In a non-limiting embodiment, the data is data coming from radio terminals of the PR4G type.

Another aspect of the invention relates to a system for monitoring data exchange over a network of the H link type implementing a technology of the TDMA type designed and arranged to implement a method for monitoring data exchange over a network of the H link type implementing a technology of the TDMA type according to at least one of the implementations of the method in accordance with that of the invention.

BRIEF DESCRIPTION OF THE FIGURES

Other characteristics and advantages of the invention shall become clear from the description which is provided of them hereinbelow, for the purposes of information and in no way limiting, in reference to the annexed figures, along which.

For reasons of clarity, only those elements useful for the comprehension of the invention have been shown and this, without respect to scale and diagrammatically. Furthermore, similar elements located in different figures comprise identical references.

DETAILED DESCRIPTION OF AT LEAST ONE EMBODIMENT OF THE INVENTION

Figure 1:
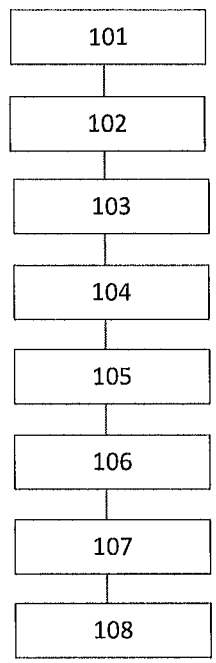
FIG. 1 shows a diagram of the steps of a method for monitoring data exchange over a network of the H link type implementing a time division multiple access technology in accordance with that of the invention.
Figure 2:
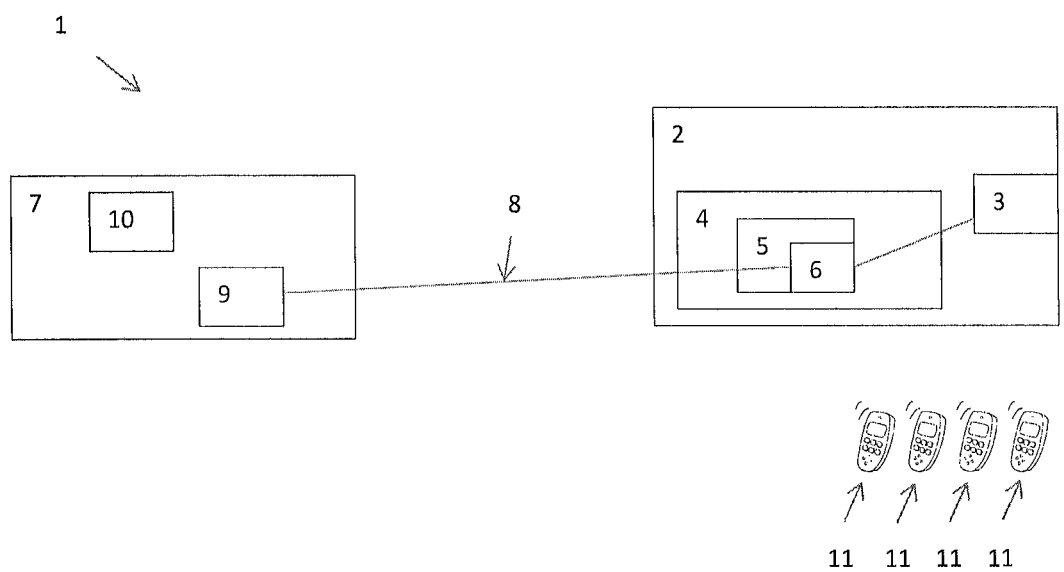
FIG. 2 shows an embodiment of a system for monitoring data exchange over a network of the H link type implementing a time division multiple access technology in accordance with that of the invention.

FIG. 1 shows a diagram of the steps of a method 100 for monitoring data exchange over a network of the H link type implementing a time division multiple access technology in accordance with that of the invention. FIG. 2 shows an embodiment of a system 1 for monitoring data exchange over a network of the H link type implementing a time division multiple access technology in accordance with that of the invention, with the system being designed and arranged to implement the method 100.

In order to facilitate the understanding of the invention, the method 100 is described in what follows using FIG. 1 and also FIG. 2.

In this non-limiting implementation, the method 100 comprises a step 101 of transmitting a monitoring agent 5 from a remote server 7 to a communication server 2.

In a non-limiting embodiment, the monitoring agent 5 of the remote server 7 is transmitted to the communication server 2 via a connection of the LAN type 8.

The method 100 further comprises a step 102 of installing the monitoring agent 5 on the communication server 2. In a non-limiting embodiment, the communication server 2 implements a container 4. This container 4 is designed and arranged to install the monitoring agent 5 on the communication server 2. This container 4 makes it possible to restrict the resources used by the monitoring agent 5, prevents errors during the reception of data coming from the terminals 11 and the transmission of data to the remote server 7. Generally, this container 4 contains, installs and launches the monitoring agent 5 in order to prevent disturbing the operation of the communication server 2.

The method 100 comprises a step of launching 103 the monitoring agent 5 on the communication server 7. This step of launching 103 is carried out by the container 4. The monitoring agent 5 implements an interface for receiving and for transmitting data 6 designed and arranged to receive the data received by the communication server 2 and to transmit the data received by the monitoring agent 5 to the remote server 7. For example, the container 4 can know the interface 3 via which the communication server 2 receives the data from the various radio terminals 11, for example of the PR4G type. The container 4 also knows the interface for receiving and for transmitting data 6 of the monitoring agent 5 in such a way as to cause the data exchanged by the terminals 11 of the network of the H link type to transit to the monitoring agent 5.

The method 100 also comprises an additional step 104 of transmission of data received by the monitoring agent 5 to the remote server 7. This step of transmission 104 is carried out by the monitoring agent 5. In other terms, the data of the terminals 11 is transmitted to the communication server 2 via the interface 3, then transmitted to the monitoring agent 5 via the interface 6. Then, the monitoring agent transmits the data received via the interface 6 to the remote server 7. This transmission 104 is also carried out via the interface 6 of the monitoring agent 5.

In a non-limiting embodiment, the transmission 104 of data from the monitoring agent 5 to the remote server 7 is carried out according to the communication protocol of the UDP type.

The method 100 can also comprise an additional step 105 during which the monitoring agent 5 transmits data by associating a time slot number that corresponds to the period of time during which the data was transmitted. As the architecture of a network of the H link type is an architecture of the TDMA type where the time is divided into indivisible entities: time slots. The time slots are allocated to the terminals 11 that belong to the network of the H link type. Each terminal 11 can emit data during time slots that were allocated to it beforehand. In other words, the TDMA guarantees access and speaking time to each one of the terminals 11 in the cycle formed by a set of 128 time slots at most. As such, by associating the time slot over which the data was transmitted with the data transmitted, it is possible to know the terminal 11 that has transmitted this data.

In a non-limiting embodiment, the method 100 comprises an additional step 106 of interpreting and of logging data transmitted by the monitoring agent 5. This step 106 of interpreting and of logging is carried out by a system for interpreting and for logging 9 of the remote server 7. In a non-limiting manner, this step of interpreting and of logging 106 consists in particular in classifying the data received by the remote server according to the time of transmission or of reception and of the terminal that has transmitted or received this data. During this step 106, the data can also be classified according to the type of data, for example, data coming from voice, data transmission, control messaging, real-time messaging, extended network messaging or radio telephone services.

Figure 3:
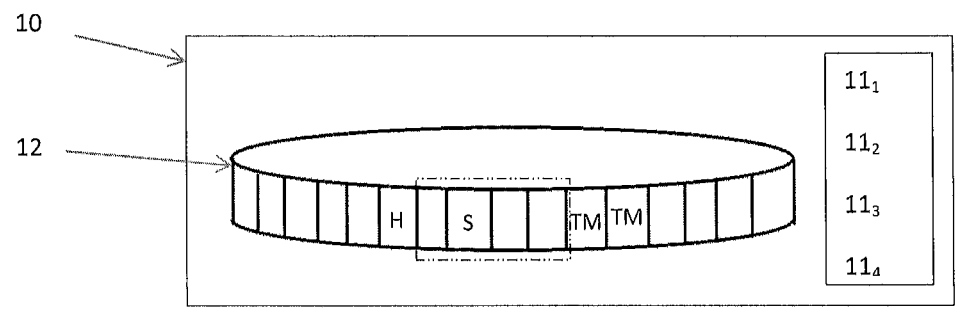
FIG. 3 shows a man-machine interface designed and arranged to display the data exchanged over a network of the H link type implementing a time division multiple access technology in accordance with that of the invention.

In a non-limiting embodiment, the method 100 comprises a step of displaying a TDMA cycle in real time 107. The display 107 is, for example, carried out by an interface of the man-machine type 10 located on the remote server 7. As shown in FIG. 3, the display 107 identifies all of the terminals $11_1$, $11_2$, $11_3$, $11_4$ that belong to the network in such a way that the operator can select the terminal that is to be monitored. Once selected, the display 107 can be carried out in the form of a rotating buffer 12 that displays a cycle composed of 38 time slots, only 16 are represented. If a time slot is used to receive data then a colour appears on the corresponding time slot, for example green, and inversely if a time slot is used to transmit data then another colour appears on the corresponding time slot, red for example. As such, the operator can quickly view on which time slot data has been received or transmitted. Furthermore, the type of message can be displayed on the time slot. For example, if a complete message of 6 bytes at most was transmitted then the letter H is displayed on the time slot. If a message was segmented because it exceeded 6 bytes then the latter S is displayed on the time slot. If a message was excessively long and it was separated into 2 messages of 6 bytes for the transmission then the letters TM are displayed on the time slot.

Furthermore, as shown it is possible to group together a certain number of users forming a loop 13. To do this, the operator defines via the man-machine interface 10 a loop of terminals 13 comprising a determined number of terminals, for example 3. As soon as the loop 13 is determined, the man-machine interface 10 displays a loop 13 by surrounding the terminals of the loop 13 in such a way as to allow the operator to monitor the data exchange carried out between the users that are part of this loop 13.

In a particular application of the method according to the invention, the data exchanged within the network of the H link type is radio data from PR4G terminals. Generally, the communication server 2 and the remote server 7 can comprise one or several microprocessors designed and adapted to execute sequences of instructions that allow for an implementation of the steps 101, 102, 103, 104, 105, 106, 107, 108 of the method 100 in accordance with the invention.

As shown in FIG. 2, the invention also relates to a system 1 for monitoring data exchange over a network of the H link type implementing a time division multiple access technology in accordance with that of the invention.

In this non-limiting implementation, the system 1 comprises a communication server 2 that implements an interface for receiving the data 3 exchanged between terminals 4 of the network of the H link type. The communication server 2 identifies the data exchange taking place between the terminals 11 of the network.

The communication server 2 also comprises a container 4 comprising a monitoring agent 5 having an interface 6 for receiving and for transmitting data. More particularly, this interface 6 is designed and arranged to receive the data received via the receiving interface 3 of the communication server 2 and to transmit the data received to a remote server 7.

The system 1 comprises a remote server 7 connected to the communication server 2 via a connection of the LAN type 8. As such, the data transmitted by the interface 6 of the monitoring agent 5 is received by the remote server 7 via the connection of the LAN type 8.

The remote server 7 comprises a system for interpreting and for logging 9 data transmitted by the monitoring agent 5.

The remote server 7 further comprises a man-machine interface 10 designed and arranged to display a complete TDMA cycle in real time. In other words, the data exchanged on the communication server 2 during a cycle can be viewed by an operator using this man-machine interface 10.

The invention claimed is:

1. A method comprising: monitoring data broadcasted by a plurality of terminals that are each allocated one or more time slots based on a time division multiple access (TDMA) scheme, the monitoring including
    transmitting, over a first network, a monitoring agent from a remote server to a communication server,
    installing said monitoring agent on the communication server,
    launching said monitoring agent on the communication server, said monitoring agent comprising a data interface, the data interface being configured to receive the data broadcasted by the plurality of terminals over a second network and received by the communication server,
    transmitting said data to the remote server, said transmitting said data being carried out by the data interface of said monitoring agent, wherein data received by the communication server are initially transmitted together with an associated time slot number from said monitoring agent to the remote server so as to identify which terminal from among the plurality of terminals has broadcasted said data.

2. The method of claim 1, wherein the installing said monitoring agent on the communication server is carried out using a container of the communication server, and wherein the container restricts resources used by the monitoring agent such that operation of the communication server is undisturbed.

3. The method of claim 1, wherein the first network comprises a local area network (LAN).

4. The method of claim 1, wherein the transmitting said data from the monitoring agent to the remote server is carried out according to a user datagram protocol (UDP).

5. The method of claim 1, further comprising interpreting and logging data transmitted by the monitoring agent, said interpreting and logging being carried out by the remote server.

6. The method of claim 1, further comprising displaying a TDMA cycle in real time, said displaying being carried out by a man-machine interface.

7. The method of claim 1, wherein the plurality of terminals are PR4G radio terminals.

8. The method of claim 1, further comprising:
    identifying, by the remote server, a terminal that broadcasted the data to the communication server based on the associated time slot number.

9. The method of claim 5, wherein said interpreting and logging data comprises classifying the data according to a time of transmission and according to a terminal that has transmitted the data.

10. The method of claim 5, wherein said interpreting and logging data comprises classifying the data according to a type of data.

11. A communication system comprising at least one processor programmed to execute one or more computer program instructions for monitoring data broadcasted by a plurality of terminals that are each allocated one or more time slots based on a time division multiple access (TDMA) scheme, wherein the one or more computer program instructions, when executed, cause the at least one processor to:
    receive, over a first network, a monitoring agent from a remote server;
    install said monitoring agent;
    launch said monitoring agent, said monitoring agent comprising a data interface, the data interface being configured to receive the data broadcasted by the plurality of terminals over a second network and received by a communication server;
    transmit said data to the remote server, said transmit of said data being carried out by the data interface of said monitoring agent, wherein data received by the communication server are initially transmitted together with an associated time slot number from said monitoring agent to the remote server so as to identify which terminal from among the plurality of terminals has broadcasted said data.

12. A remote system, the remote system comprising at least one processor programmed to execute one or more computer program instructions for monitoring data broadcasted by a plurality of terminals that are each allocated one or more time slots based on a time division multiple access (TDMA) scheme, wherein the one or more computer program instructions, when executed, cause the at least one processor to:
    transmit, over a first network, a monitoring agent to a communication server such that said monitoring agent is:
        installed on the communication server, and
        launched at the communication server, said monitoring agent comprising a data interface, the data interface being configured to receive the data broadcasted by the plurality of terminals over a second network and received by the communication server;
    receive, over the first network, said data, transmission of said data being carried out by the data interface of said monitoring agent, wherein data received by the communication server are initially transmitted together with an associated time slot number from said monitoring agent to a remote server so as to identify which terminal from among the plurality of terminals has broadcasted said data.

\* \* \* \* \*